US009446675B2

(12) United States Patent
Konno

(10) Patent No.: US 9,446,675 B2
(45) Date of Patent: Sep. 20, 2016

(54) NON-CONTACT POWER SUPPLY APPARATUS, NON-CONTACT POWER SUPPLY SYSTEM, AND NON-CONTACT POWER SUPPLY METHOD

(71) Applicant: NISSAN MOTOR CO., LTD., Yokohama-shi, Kanagawa (JP)

(72) Inventor: Masaki Konno, Fujisawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/649,097

(22) PCT Filed: Nov. 14, 2013

(86) PCT No.: PCT/JP2013/080773
§ 371 (c)(1),
(2) Date: Jun. 2, 2015

(87) PCT Pub. No.: WO2014/087823
PCT Pub. Date: Jun. 12, 2014

(65) Prior Publication Data
US 2015/0328995 A1 Nov. 19, 2015

(30) Foreign Application Priority Data
Dec. 3, 2012 (JP) ................ 2012-263963

(51) Int. Cl.
*H02J 7/00* (2006.01)
*B60L 11/18* (2006.01)
(Continued)

(52) U.S. Cl.
CPC ............ *B60L 11/182* (2013.01); *B60L 3/0069* (2013.01); *B60L 11/1803* (2013.01);
(Continued)

(58) Field of Classification Search
CPC ....................................................... H02J 7/025
USPC ........................................................ 320/108
See application file for complete search history.

(56) References Cited

U.S. PATENT DOCUMENTS 5,821,731 A * 10/1998 Kuki .................. B60L 11/1805
320/108
2007/0181354 A1* 8/2007 Andri ....................... B60K 6/48
180/65.29

(Continued)

FOREIGN PATENT DOCUMENTS

EP 0788212 A2 8/1997
EP 2431212 A1 3/2012
(Continued)

*Primary Examiner* — Edward Tso
*Assistant Examiner* — Ahmed Omar
(74) *Attorney, Agent, or Firm* — Young Basile Hanlon & MacFarlane, P.C.

(57) ABSTRACT

A non-contact power supply apparatus includes a power receiving coil and transmits and receives power in a non-contact manner through magnetic coupling between the power receiving coil and a power transmitting coil included in a ground-side unit. The non-contact power supply apparatus includes: a remaining power detecting part configured to detect the remaining power of a battery; a charge start determining part configured to determine whether or not to start a charge operation of the battery, based on whether or not the remaining power of the battery detected by the remaining power detecting part is equal to or less than a charge start threshold; and a charge controlling part configured to start the charge operation if the charge start determining part determines that the charge operation is to be started.

9 Claims, 6 Drawing Sheets

(51) Int. Cl.
  *B60L 3/00* (2006.01)
  *H02J 17/00* (2006.01)
  *H02J 7/02* (2016.01)

(52) U.S. Cl.
  CPC ....... *B60L 11/1824* (2013.01); *B60L 11/1833* (2013.01); *B60L 11/1846* (2013.01); *B60L 11/1861* (2013.01); *H02J 7/00* (2013.01); *H02J 7/0047* (2013.01); *H02J 7/025* (2013.01); *H02J 17/00* (2013.01); *H02J 50/10* (2016.02); *H02J 50/80* (2016.02); *B60L 2210/30* (2013.01); *B60L 2210/40* (2013.01); *B60L 2240/12* (2013.01); *B60L 2240/486* (2013.01); *B60L 2250/10* (2013.01); *B60L 2250/16* (2013.01); *H02J 7/0004* (2013.01); *H02J 7/02* (2013.01); *H02J 2007/005* (2013.01); *Y02T 10/705* (2013.01); *Y02T 10/7005* (2013.01); *Y02T 10/7044* (2013.01); *Y02T 10/7072* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| 2011/0163722 A1 | 7/2011 | Gale et al. |
| 2012/0098501 A1 | 4/2012 | Paryani |
| 2012/0194127 A1 | 8/2012 | Kobayashi et al. |

FOREIGN PATENT DOCUMENTS

| EP | 2490318 A1 | 8/2012 |
| JP | 08126120 A | 5/1996 |
| JP | 2005168085 A | 6/2005 |
| JP | 2010183804 A | 8/2010 |
| JP | 2012005238 A | 1/2012 |
| JP | 2012161145 A | 8/2012 |
| WO | 2011046223 A1 | 4/2011 |

\* cited by examiner

NON-CONTACT POWER SUPPLY APPARATUS, NON-CONTACT POWER SUPPLY SYSTEM, AND NON-CONTACT POWER SUPPLY METHOD

CROSS REFERENCE TO RELATED APPLICATION

The present application claims priority to Japanese Patent Application No. 2012-263963 (filed on Dec. 3, 2012), incorporated herein in its entirety.

TECHNICAL FIELD

The present invention relates to a non-contact power supply apparatus, a non-contact power supply system, and a non-contact power supply method.

BACKGROUND

A non-contact power supply apparatus has been proposed which includes a power receiving coil and is configured to charge a battery mounted on an electric vehicle or the like, in a non-contact manner through magnetic coupling between the power receiving coil and a power transmitting coil provided on the ground (see Japanese Patent Application Publication No. 2012-005238). This non-contact power supply apparatus starts the non-contact supply of power, for example, when the user aligns the power transmitting coil and the power receiving coil with each other and then operates a charge start switch.

SUMMARY

The non-contact power supply apparatus described in Japanese Patent Application Publication No. 2012-005238 is convenient since there is no need to insert a charge plug into a charge port on the vehicle side. However, the non-contact power supply apparatus described in Japanese Patent Application Publication No. 2012-005238 cannot start charging the battery without some operation such as operating the charge start switch as mentioned above. Thus, there still is room for improvement in convenience.

The present invention has been made to solve a problem as mentioned above, and an object thereof is to provide a non-contact power supply apparatus, a non-contact power supply system, and a non-contact power supply method which are capable of further improving convenience.

A non-contact power supply apparatus according to one aspect of the present invention is configured to detect the remaining power of a battery included in a vehicle, determine whether or not to start a charge operation of the battery, based on whether or not the remaining power thus detected is equal to or less than a charge start threshold, and start the charge operation if it is determined that the charge operation is to be started.

DESCRIPTION OF EMBODIMENTS

Figure 1:
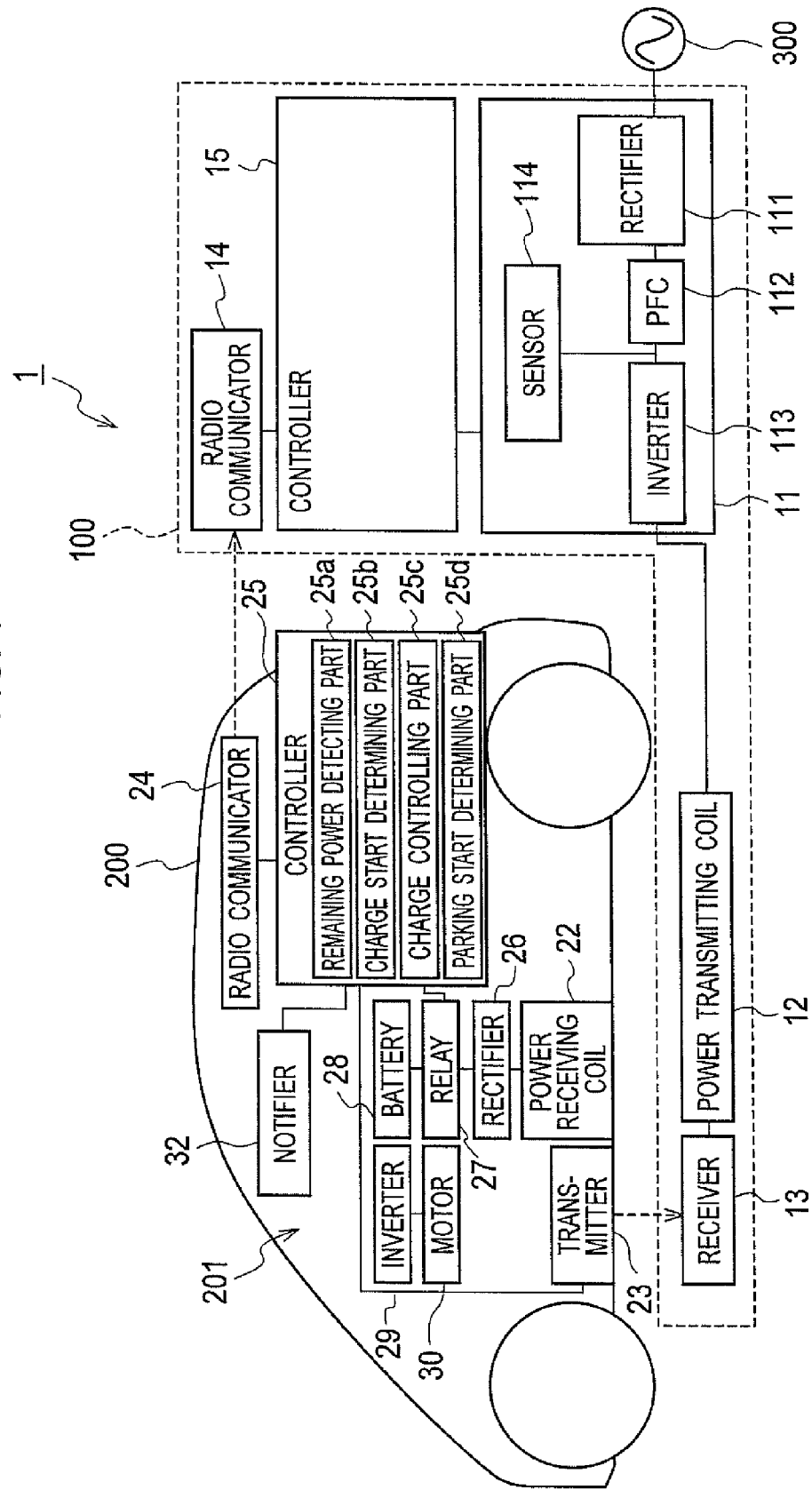
FIG. 1 is a block diagram showing a schematic configuration of a non-contact power supply system including a non-contact power supply apparatus according to a first embodiment.

Hereinbelow, embodiments of the present invention will be described with reference to the drawings. First, a schematic configuration of a non-contact power supply system including a non-contact power supply apparatus according to a first embodiment will be described with reference to FIG. 1. A non-contact power supply system 1 according to the first embodiment includes a non-contact power supply apparatus 201 as a vehicle-side unit mounted on a vehicle 200, and a ground-side unit 100. The non-contact power supply system 1 is a system configured to supply power in a non-contact manner from the ground-side unit 100 to the non-contact power supply apparatus 201 to charge a battery 28 provided in the vehicle 200.

The ground-side unit 100 is installed at a power supply station, a parking lot, or the like. The ground-side unit 100 is configured to supply power from a power transmitting coil 12 to a later-described power receiving coil 22 in a non-contact manner while the vehicle 200 is parked at a predetermined parking position. The ground-side unit 100 includes a power controller 11, the power transmitting coil 12, a receiver 13, a radio communicator 14, and a controller 15.

The power controller 11 is a circuit configured to convert AC power fed from an AC power source 300 into high-frequency AC power and transmit it to the power transmitting coil 12. The power controller 11 includes a rectifier 111, a PFC (Power Factor Correction) circuit 112, an inverter 113, and a sensor 114.

The rectifier 111 is a circuit electrically connected to the AC power source 300 and configured to rectify the AC power outputted from the AC power source 300. The PFC circuit 112 is a circuit configured to rectify the waveform outputted from the rectifier 111 to improve the power factor, and is connected between the rectifier 111 and the inverter 113. The inverter 113 is a power conversion circuit including, for example, a PWM control circuit having a smoothing capacitor and a switching element such as an IGBT. The inverter 113 is configured to convert DC power to high-frequency AC power based on a switching control signal from the controller 15 and supplies it to the power transmitting coil 12. The sensor 114 is connected between the PFC circuit 112 and the inverter 113 and configured to detect the current and voltage between the PFC circuit 112 and the inverter 113.

The power transmitting coil 12 is a coil configured to supply power in a non-contact manner to the power receiving coil 22 mounted on the vehicle 200, and is wound in, for example, a circular (including elliptical) shape or a polygonal shape in parallel with the road surface of the parking space. The power transmitting coil 12 is provided within the parking space. Specifically, the power transmitting coil 12 is provided at such a position as to be situated immediately under the power receiving coil 22 with a given distance kept from the power receiving coil 22 when the vehicle 200 is parked at a predetermined parking position in the parking space.

The receiver 13 is a sensor including reception antennas and is configured to detect magnetic fields in the vicinity of the reception antennas. The receiver 13 receives electromagnetic waves transmitted from a transmitter 23 of the vehicle 200. The frequency of electromagnetic waves used in the communication between the receiver 13 and the transmitter 23 may be a frequency within a frequency band used by vehicle peripheral devices such as Intelligent Key (registered trademark), or a frequency around this frequency band. A communication method suitable for close-range communication is used for the communication between the receiver 13 and the transmitter 23.

The radio communicator 14 is configured to perform two-way communication with a radio communicator 24 mounted on the vehicle 200. The frequency of electromagnetic waves used in the communication between the radio communicator 14 and the radio communicator 24 is set to a frequency higher than the frequencies used by the vehicle peripheral devices such as Intelligent Key (registered trademark), in view of interference with the vehicle peripheral devices. Communication methods suitable for long-range communication such as various wireless LAN methods are available for the communication between the radio communicator 14 and the radio communicator 24.

The controller 15 is configured to control the entire ground-side unit 100. Specifically, the controller 15 controls the power controller 11 and the radio communicator 14. Through communication between the radio communicator 14 and the radio communicator 24, the controller 15 transmits, to the vehicle 200 side, a control signal indicating start of supply of power from the ground-side unit 100, and receives, from the vehicle 200 side, a request signal requesting supply of power from the ground-side unit 100. The controller 15 controls the switching of the inverter 113 based on the current detected by the sensor 114 to control the power to be transmitted from the power transmitting coil 12.

The non-contact power supply apparatus 201 as the vehicle-side unit includes the power receiving coil 22, the transmitter 23, the radio communicator 24, a controller 25, a rectifier 26, a relay 27, the battery 28, an inverter 29, a motor 30, and a notifier 32. The power receiving coil 22 is a coil configured to receive power in a non-contact manner from the power transmitting coil 12 of the ground-side unit 100. The power receiving coil 22 is provided at a bottom part of the vehicle 200. Like the power transmitting coil 12, the power receiving coil 22 is wound in, for example, a circular (including elliptical) shape or a polygonal shape in parallel with the road surface of the parking space. The power receiving coil 22 is provided at such a position as to be situated immediately above the power transmitting coil 12 with a given distance kept from the power transmitting coil 12 when the vehicle 200 is parked at the predetermined parking position in the parking space.

The transmitter 23 is a sensor including a transmission antenna and configured to transmit electromagnetic waves to the receiver 13.

The radio communicator 24 is configured to perform two-way communication with the radio communicator 14 provided on the ground-side unit 100 side. The rectifier 26 is formed by a rectification circuit connected to the power receiving coil 22 and configured to rectify the AC power received by the power receiving coil 22 into DC power. The relay 27 includes a relay switch configured to be switched on and off through control by the controller 25, and has a function of disconnecting a high power system including the battery 28 and a low power system serving as a charge circuit section including the power receiving coil 22 and the rectifier 26 from each other by switching off the relay switch.

The battery 28 serves as a source of power for the vehicle 200 and is formed by connecting a plurality of secondary batteries. The inverter 29 is a control circuit such as a PWM control circuit including a switching element such as an IGBT. The inverter 29 is configured to convert DC power outputted from the battery 28 into AC power based on a switching control signal and supply it to the motor 30. The motor 30 is formed, for example, as a three-phase AC motor and serves as a source of power for driving the vehicle 200.

The controller 25 is configured to control the radio communicator 24 and the switching of the inverter 29. The controller 25 includes a remaining power detecting part (remaining power detecting means) 25a, a charge start determining part (charge start determining means) 25b, a charge controlling part (charge controlling means) 25c, and a parking start determining part (parking start determining means) 25d.

The remaining power detecting part 25a is configured to detect the remaining power of the battery 28 of the vehicle 200 parked in a parking space in which the power transmitting coil 12 is provided, i.e. the battery 28 of the vehicle 200 parked in a parking space designated by the ground-side unit 100. The remaining power detecting part 25a calculates the remaining power from the battery voltage or calculates the remaining power from the charge-discharge balance, for example.

The charge start determining part 25b is configured to determine whether or not to start a charge operation of the battery 28, e.g. whether or not to start an operation of applying high-frequency power to the power transmitting coil 12, based on whether or not the remaining power detected by the remaining power detecting part 25a is equal to or less than a charge start threshold. Specifically, the charge start determining part 25b determines that a charge operation is to be started if the remaining power of the battery 28 is equal to or less than the charge start threshold, and determines that no charge operation is to be started if the remaining power of the battery 28 is greater than the charge start threshold.

The charge controlling part 25c is configured to start a charge operation if the charge start determining part 25b determines that a charge operation is to be started. Specifically, if the charge start determining part 25b determines that a charge operation is to be started, the charge controlling part 25c controls the radio communicator 24 to transmit, to the ground-side unit 100, a control signal requesting supply of power. The radio communicator 14 of the ground-side unit 100 receives the control signal, and the controller 15 controls the power controller 11 to apply high-frequency power to the power transmitting coil 12. Moreover, if the charge start determining part 25b determines that a charge operation is to be performed, the charge controlling part 25c switches on the relay 27 to control the non-contact power supply apparatus 201 in a state where power can be received.

The parking start determining part 25d is configured to determine whether or not the vehicle 200 has started to be parked. The parking start determining part 25d determines whether or not the vehicle 200 has started to be parked, based, for example, on its GPS information and map information. Specifically, the parking start determining part 25d locates the position of the vehicle 200 from its GPS information, and determines that the vehicle 200 has started to be parked when the located position comes near the position of the ground-side unit 100. Note that the parking start determining part 25*d* may instead determine that the vehicle 200 has started to be parked when its shift position is detected as being moved to the rear (reverse) position. Alternatively, the parking start determining part 25*d* may determine that the vehicle has started to be parked when its speed falls to or below a given speed.

The notifier 32 includes a navigation system's display provided at a position from which the display is visible to the driver, an alarm lamp, and a speaker. The notifier 32 is configured to provide the driver with various kinds of information based on signals from the controller 25.

Figure 2:
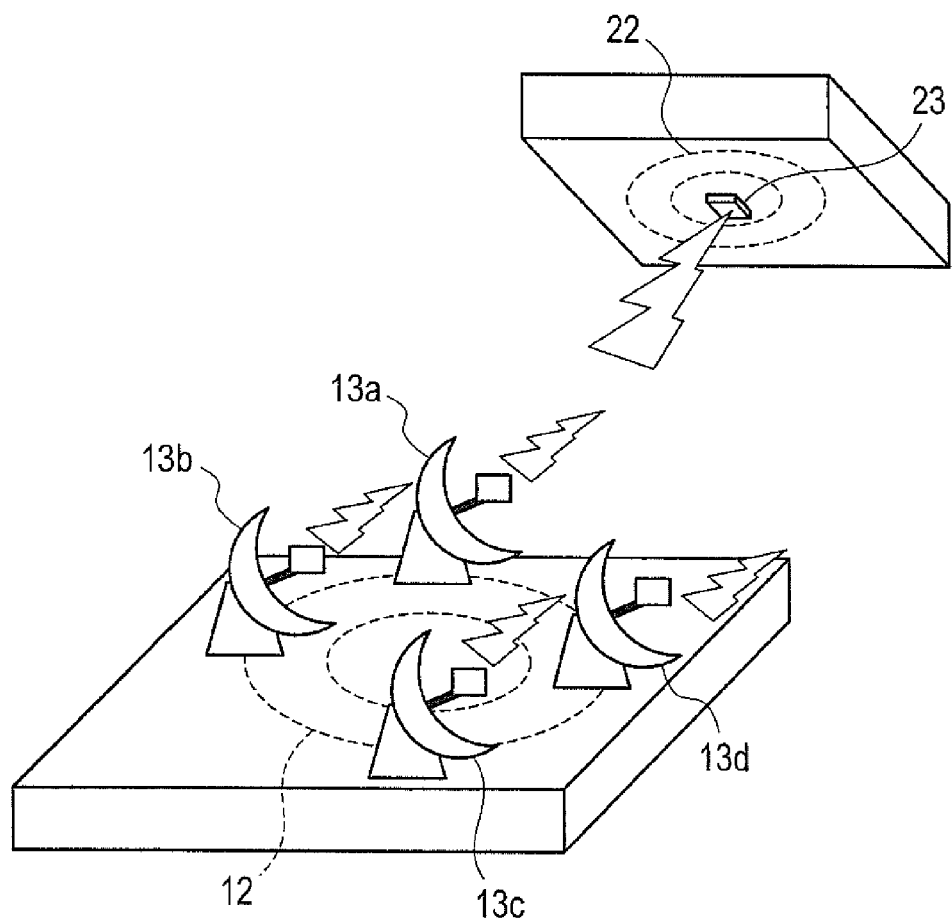
FIG. 2 is a schematic diagram showing specific configurations of a transmitter and a receiver shown in FIG. 1.

Specific configurations of the transmitter 23 and the receiver 13 in FIG. 1 will be described with reference to FIG. 2. The receiver 13 includes four reception antennas 13*a* to 13*d*. The four reception antennas 13*a* to 13*d* are situated at the periphery of the power transmitting coil 12 away from the center of the power transmitting coil 12 by the same distance, and the reception antennas 13*a* to 13*d* are disposed at 90-degree intervals about the center of the power transmitting coil 12. On the other hand, the transmitter 23 includes one transmission antenna. The transmission antenna is provided at a position which is the center of the power receiving coil 22.

The power transmitting coil 12 and the receiver 13 are provided to the ground-side unit 100, and their positions therefore remain unchanged. On the other hand, the power receiving coil 22 and the transmitter 23 are provided to the vehicle 200, and their positions relative to the power transmitting coil 12 and the receiver 13 therefore change in accordance with the position of the vehicle 200.

Here, if the vehicle is parked such that the centers of the power receiving coil 22 and the power transmitting coil 12 coincide with each other, the distances from the four reception antennas 13*a* to 13*d* to the transmission antenna will be equal to each other, and the strengths of electromagnetic waves received by the four reception antennas 13*a* to 13*d* will therefore be equal to each other as well. On the other hand, if the centers of the power receiving coil 22 and the power transmitting coil 12 are offset from each other, the strengths of electromagnetic waves received by the four reception antennas 13*a* to 13*d* will not be equal to each other. The controller 15 of the ground-side unit 100 determines whether or not the alignment is completed based on the above information. Note that it is possible to provide the transmitter 23 to the ground-side unit 100 and the receiver 13 to the non-contact power supply apparatus 201, and determine whether or not the alignment is completed with the controller 25 of the non-contact power supply apparatus 201.

Next, a non-contact power supply method according to the first embodiment will be described. First of all, assume that the vehicle 200 has come near the ground-side unit 100. Here, the parking start determining part 25*d* determines that the vehicle 200 has started to be parked, based, for example, on its GPS information and map information.

If the parking start determining part 25*d* determines that parking is started, the charge controlling part 25*c* of the vehicle 200 starts the radio communicator 24 and transmits a start signal to the ground-side unit 100 therethrough. As a result, the ground-side unit 100 is started.

Then, the controller 25 of the vehicle 200 transmits a signal for establishing a link from the radio communicator 24 to the radio communicator 14. Then, the controller 15 of the ground-side unit 100 returns a signal indicating that the signal has been received, from the radio communicator 14 to the radio communicator 24. As a result, a link is established between the radio communicator 14 and the radio communicator 24.

Moreover, the controller 25 of the vehicle 200 transmits an ID of the vehicle 200 to the controller 15 of the ground-side unit 100 through communication between the radio communicator 14 and the radio communicator 24. The controller 15 of the ground-side unit 100 performs ID authentication by determining whether or not the ID transmitted from the vehicle 200 side matches an ID which has been registered in advance. Note that in the non-contact power supply system 1 according to the first embodiment, the IDs of vehicles 200 which are capable of receiving power are registered in advance in the ground-side unit 100. In this way, only a vehicle 200 with an ID matching its registered ID in the above ID authentication can receive power. The non-contact power supply system 1, however, is not limited to this configuration and may not use any ID authentication.

Meanwhile, the remaining power detecting part 25*a* detects the remaining power of the battery 28 during the ID authentication. Then, the charge start determining part 25*b* determines whether or not to start a charge operation of the battery 28, based on whether or not the remaining power detected by the remaining power detecting part 25*a* is equal to or less than the charge start threshold. Thereafter, if the charge start determining part 25*b* determines that a charge operation is to be started, the charge controlling part 25*c* switches on the relay 27 and controls the radio communicator 24 to transmit, to the ground-side unit 100, a control signal requesting supply of power. As a result, the radio communicator 14 of the ground-side unit 100 receives the control signal, and the controller 15 controls the power controller 11 to apply high-frequency power to the power transmitting coil 12 after waiting until the coils are aligned, i.e. after waiting until the parking is completed.

As described above, with the non-contact power supply system 1 (non-contact power supply apparatus 201) according to the first embodiment, the user can charge the battery 28 by simply parking the vehicle 200 in the parking space, without having to operate a charge start switch or the like. Thus, convenience can be further improved.

Note that in the above case, if it is determined that parking is started, the ground-side unit 100 is started, and the controller 15 of the ground-side unit performs a failure diagnosis between the start and the completion of the parking. If the diagnosis result indicates that a failure is detected, the controller 15 transmits information to the non-contact power supply apparatus 201 to notify the user of that fact through the notifier 32. In this way, it is possible to prevent a situation where the vehicle 200 is actually parked but the battery 28 cannot be charged. Further, the controller 15 of the ground-side unit 100 guides the vehicle 200 to the predetermined parking position in the parking space between the start and the completion of the parking. In this step, the controller 15, for example, transmits information indicating in which direction the vehicle 200 should be moved to the non-contact power supply apparatus 201 based on the strengths of electromagnetic waves detected by the receiver 13 so that the coils can be aligned accurately. In this way, it is possible to assist the operation of the vehicle until the parking is completed. Thus, convenience can be improved.

Moreover, the charge start determining part 25*b* changes the charge start threshold in accordance with the conditions of use of the battery 28 during the travel of the vehicle 200 before the parking. The conditions of use of the battery 28 refer, for example, to whether an air conditioner is used and the degree of the power efficiency. The charge start determining part 25b changes the charge start threshold based on these pieces of information. In this way, it is possible to lower the charge start threshold to reduce the possibility of power shortage in the case, for example, where the battery 28 has been degraded and therefore has a low power efficiency, and also lower the charge start threshold to reduce the possibility of power shortage in the case, for example, where the vehicle 200 has been using its air conditioner before the charge, and the power efficiency is assumed to be low during the travel after the charge. Moreover, in the case where the battery 28 is new, the charge start threshold may be raised since the power efficiency is predicted to be high.

Thereafter, the charge controlling part 25c ends the charge operation if the remaining power of the battery 28 reaches or exceeds a charge end threshold which is different from the charge start threshold. The remaining power of the battery 28 in this step may be one detected by the remaining power detecting part 25a or one obtained by adding the amount of charge to the remaining power before the parking. Since the charge start threshold and the charge end threshold differ from each other as described above, a hysteresis is provided for both thresholds. Thus, it is possible to prevent a situation where charge ends immediately after the start of the charge.

Meanwhile, suppose a case where the vehicle 200 is left parked in the parking space over a long period of time, such as a case where the vehicle 200 is not driven for, for example, several days after the end of its charge. In this case, the remaining power detecting part 25a detects the remaining power every predetermined period of time. The charge start determining part 25b then compares the remaining power detected every predetermined period of time with the charge start threshold to determine whether or not to start a charge operation. If the result of the determination indicates that a charge operation is to be started, the charge controlling part 25c starts a charge operation as described above. In this way, it is possible to handle the decrease in remaining power due to self-discharge in the first embodiment.

Figure 3:
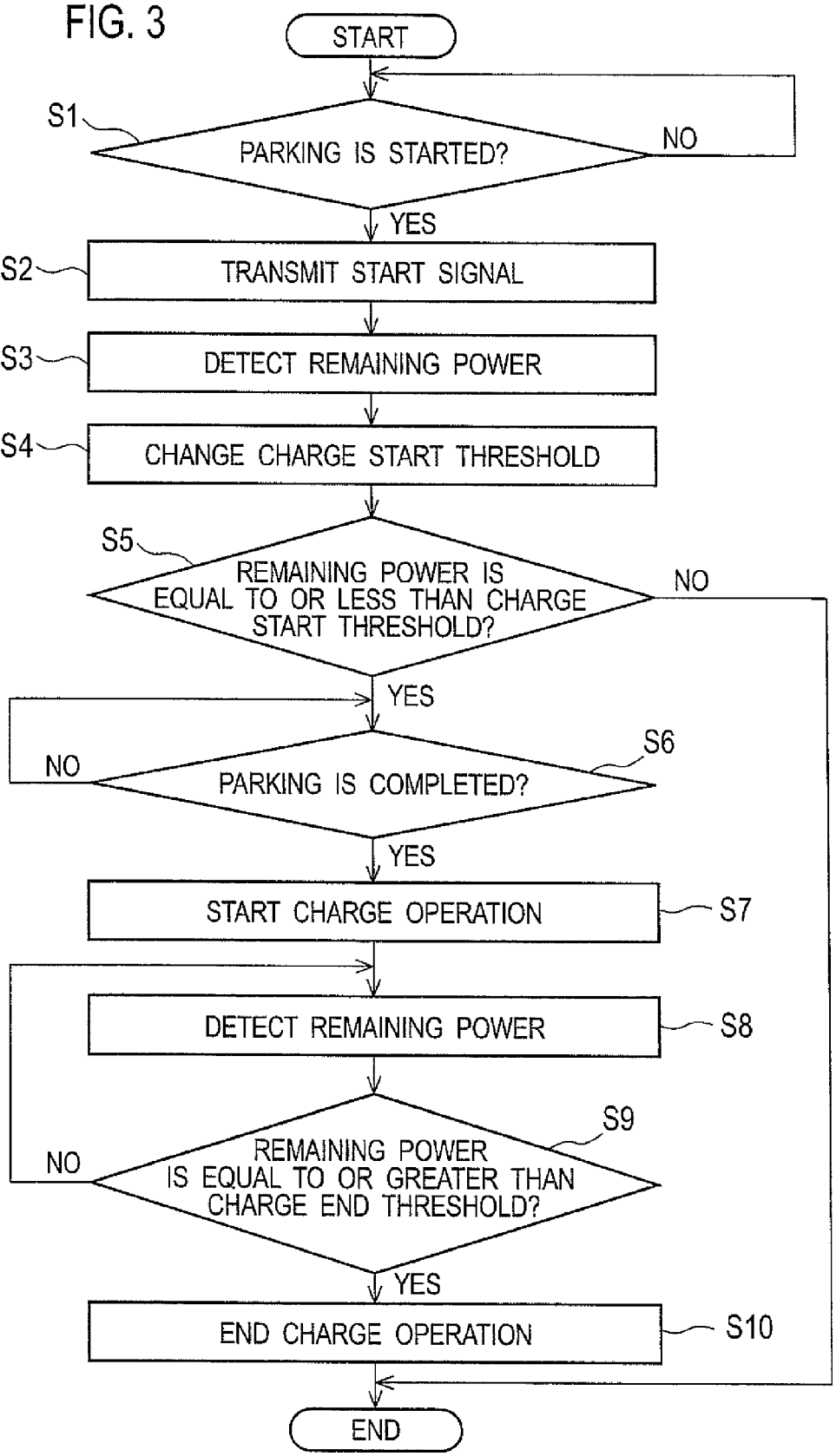
FIG. 3 is a flowchart showing an example of a non-contact power supply method according to the first embodiment.

Next, an example of the non-contact power supply method according to the first embodiment will be described with reference to FIG. 3. First, the controller 15 of the non-contact power supply apparatus 201 determines whether or not parking is started (S1). In this process, the controller 15 determines whether parking is started, based, for example, on whether the vehicle 200 has come near the ground-side unit 100, whether or not the shift position has been moved to the reverse (rear) position, and whether or not the vehicle speed has fallen to or below a given speed. Note that the method of determining whether or not parking is started is not limited to the above.

If parking is not yet started (S1: NO), the process in step S1 is repeated until it is determined that parking is started. On the other hand, in the case where parking is started (S1: YES), the charge controlling part 25c transmits a start signal to the ground-side unit 100 through the radio communicator 24 (S2). As a result, the ground-side unit is started. Then, the ground-side unit 100 performs processes such as the failure diagnosis and the alignment guidance.

Note that if a failure is determined to be occurring as a result of the failure diagnosis by the ground-side unit 100, the non-contact power supply apparatus 201 receives a signal indicating that fact and notifies the user of the fact through the notifier 32. In this case, charge is not performed, and the processing shown in FIG. 3 ends.

Once the start signal is received, the remaining power detecting part 25a detects the remaining power of the battery 28 (S3). Then, the charge start determining part 25b changes the charge start threshold in accordance with the conditions of use of the battery 28 during the travel of the vehicle 200 before the parking (S4).

Thereafter, the charge start determining part 25b determines whether or not the remaining power detected in step S3 is equal to or less than the charge start threshold changed in step S4 (S5). If it is determined that the remaining power is not equal or less than the charge start threshold (S5: NO), the processing shown in FIG. 3 ends.

On the other hand, if it is determined that the remaining power is equal to or less than the charge start threshold (S5: YES), the controller 25 determines whether or not the parking is completed (S6). Whether or not the parking is completed is determined based, for example, on the strengths of electromagnetic waves received by the controller 15 of the ground-side unit 100 through the receiver 13. Then, if it is determined that the parking is completed, the controller 15 of the ground-side unit 100 transmits a signal indicating that fact to the non-contact power supply apparatus 201 through the radio communicator 14. The controller 25 of the non-contact power supply apparatus 201 determines that the parking is completed if receiving the signal, and determines that the parking is not yet completed if not receiving the signal.

If it is determined that the parking is not yet completed (S6: NO), the process in step S6 is repeated until it is determined that the parking is completed. In the case where it is determined that the parking is completed (S6: YES), the charge controlling part 25c starts a charge operation (S7). As a result, the battery 28 is charged.

Thereafter, the remaining power detecting part 25a detects the remaining power of the battery 28 (S8). Then, the charge controlling part 25c determines whether or not the remaining power detected in step S8 is equal to or greater than the charge end threshold (S9). Note that like the charge start threshold, the charge end threshold may be changed in accordance with the conditions of use of the battery 28 detected in step S4.

If it is determined that the remaining power is not equal to or greater than the charge end threshold (S9: NO), the processing proceeds to step S8. On the other hand, if it is determined that the remaining power is equal to or greater than the charge end threshold (S9: YES), the charge controlling part 25c ends the charge operation, and the processing shown in FIG. 3 ends.

Figure 4:
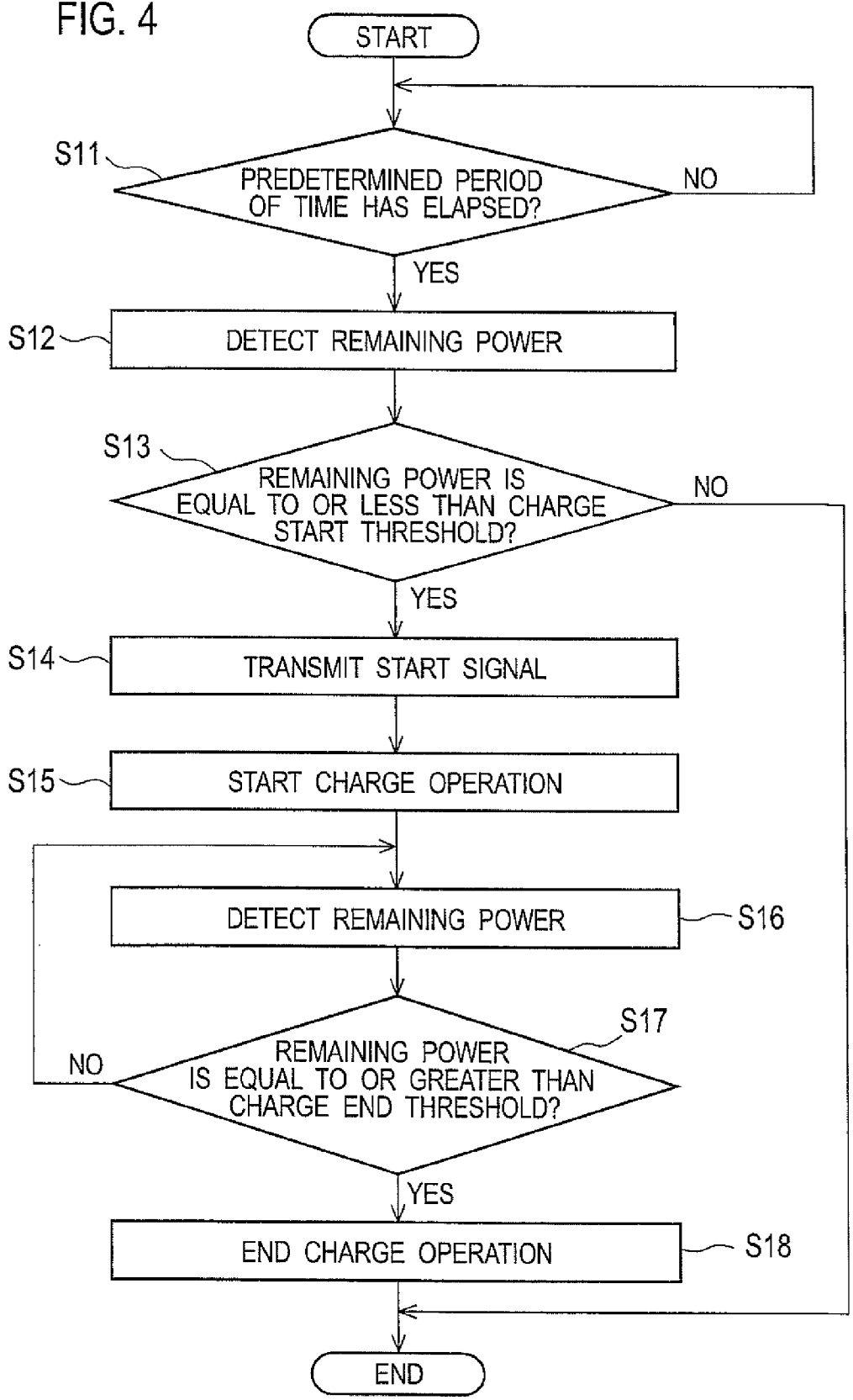
FIG. 4 is a flowchart showing another example of the non-contact power supply method according to the first embodiment, and shows processing performed while the vehicle is stopped in a parking space.

Another example of the non-contact power supply method according to the first embodiment will be described with reference to FIG. 4. Specifically, processing performed while the vehicle 200 is parked in the parking space will be described. As shown in FIG. 4, first, the controller 25 determines whether or not a predetermined period of time has elapsed (S11). Here, the start point of the predetermined period of time may be a point in any one of steps S1 to S10 shown in FIG. 3 or a point after step S10.

If the predetermined period of time has not yet elapsed (S11: NO), the process in step S11 is repeated until it is determined that the predetermined period of time has elapsed. On the other hand, if it is determined that the predetermined period of time has elapsed (S11: YES), the remaining power detecting part 25a detects the remaining power of the battery 28 (S12). Then, the charge start determining part 25b determines whether or not the remaining power detected in step S12 is equal to or less than the charge start threshold (S13). Note that the charge start threshold in the process in step S13 may be changed in accordance with the conditions of use of the battery 28 as shown in FIG. 3.

If it is determined that the remaining power is not equal to or less than the charge start threshold (S13: NO), the processing shown in FIG. 4 ends. On the other hand, if it is determined that the remaining power is equal to or less than the charge start threshold (S13: YES), the controller 25 transmits a start signal to the ground-side unit 100 through the radio communicator 24 (S14). Then, the charge controlling part 25c starts a charge operation (S15). As a result, the battery 28 is charged.

Thereafter, the remaining power detecting part 25a detects the remaining power of the battery 28 (S16). The charge controlling part 25c then determines whether or not the remaining power detected in step S16 is equal to or greater than the charge end threshold (S17). Note that like the charge start threshold, the charge end threshold may be changed in accordance with the conditions of use of the battery 28 detected in step S4.

If it is determined that the remaining power is not equal to or greater than the charge end threshold (S17: NO), the processing returns to step S16. On the other hand, if it is determined that the remaining power is equal to or greater than the charge end threshold (S17: YES), the charge controlling part 25c ends the charge operation, and the processing shown in FIG. 4 ends.

Note that in the example shown in FIG. 4, the start signal is transmitted when it is determined that the remaining power is equal to or less than the charge start threshold (S13: YES). For this reason, the ground-side unit 100 is not started every predetermined period of time so that the power consumption may be reduced. In this way, the ground-side unit 100 can perform the failure diagnosis by utilizing the time available until the start of the next charge operation.

The non-contact power supply apparatus 201 according to the first embodiment starts a charge operation when the remaining power of the battery 28 of the vehicle 200 is equal to or less than the charge start threshold. For this reason, the user can charge the battery 28 by simply parking the vehicle 200 in the parking space, without having to operate a charge start switch or the like. Thus, convenience can be further improved.

The charge start determining part 25b changes the charge start threshold in accordance with the conditions of use of the battery 28 during the travel of the vehicle 200 before it is parked. For this reason, it is possible to lower the charge start threshold to reduce the possibility of power shortage in the case, for example, where the battery 28 has been degraded and therefore has a low power efficiency. Moreover, it is possible to lower the charge start threshold to reduce the possibility of power shortage in the case, for example, where the vehicle 200 has been using its air conditioner before the charge, and the power efficiency is therefore predicted to be low during the travel after the charge.

While the vehicle 200 is parked in the parking space, the remaining power detecting part 25a detects the remaining power every predetermined period of time, and the charge start determining part 25b compares the detected remaining power with the charge start threshold to determine whether or not to start a charge operation. In this way, it is possible to start a charge operation for the decrease in remaining power due to self-discharge in a situation, for example, where the vehicle 200 is parked in the parking space over a long period of time.

When the parking start determining part 25d determines that parking is started, the charge controlling part 25c transmits a signal to the ground-side unit 100 to start the ground-side unit 100. In this way, the ground-side unit 100 can perform the failure diagnosis or guide the vehicle 200 to the parking space between the start and the completion of the parking.

When the remaining power reaches or exceeds to the charge end threshold which is different from the charge start threshold, the charge controlling part 25c ends the charge operation. In this way, a hysteresis is provided for the charge start threshold and the charge end threshold. Thus, it is possible to prevent a situation, for example, where charge ends immediately after the start of the charge.

Next, a non-contact power supply apparatus according to a second embodiment of the present invention will be described. The non-contact power supply apparatus according to the second embodiment differs from the first embodiment in some part of the configuration and the processing operation. Hereinbelow, these differences from the first embodiment will be described.

First, in the first embodiment, a start signal is transmitted to the ground-side unit 100 when it is determined that parking is started. On the other hand, in the second embodiment, a start signal is transmitted to the ground-side unit 100 when it is determined that parking is completed. In this way, the ground-side unit 100 will never be started between the start and the completion of parking. Thus, the power consumption can be reduced as compared to the first embodiment.

Figure 5:
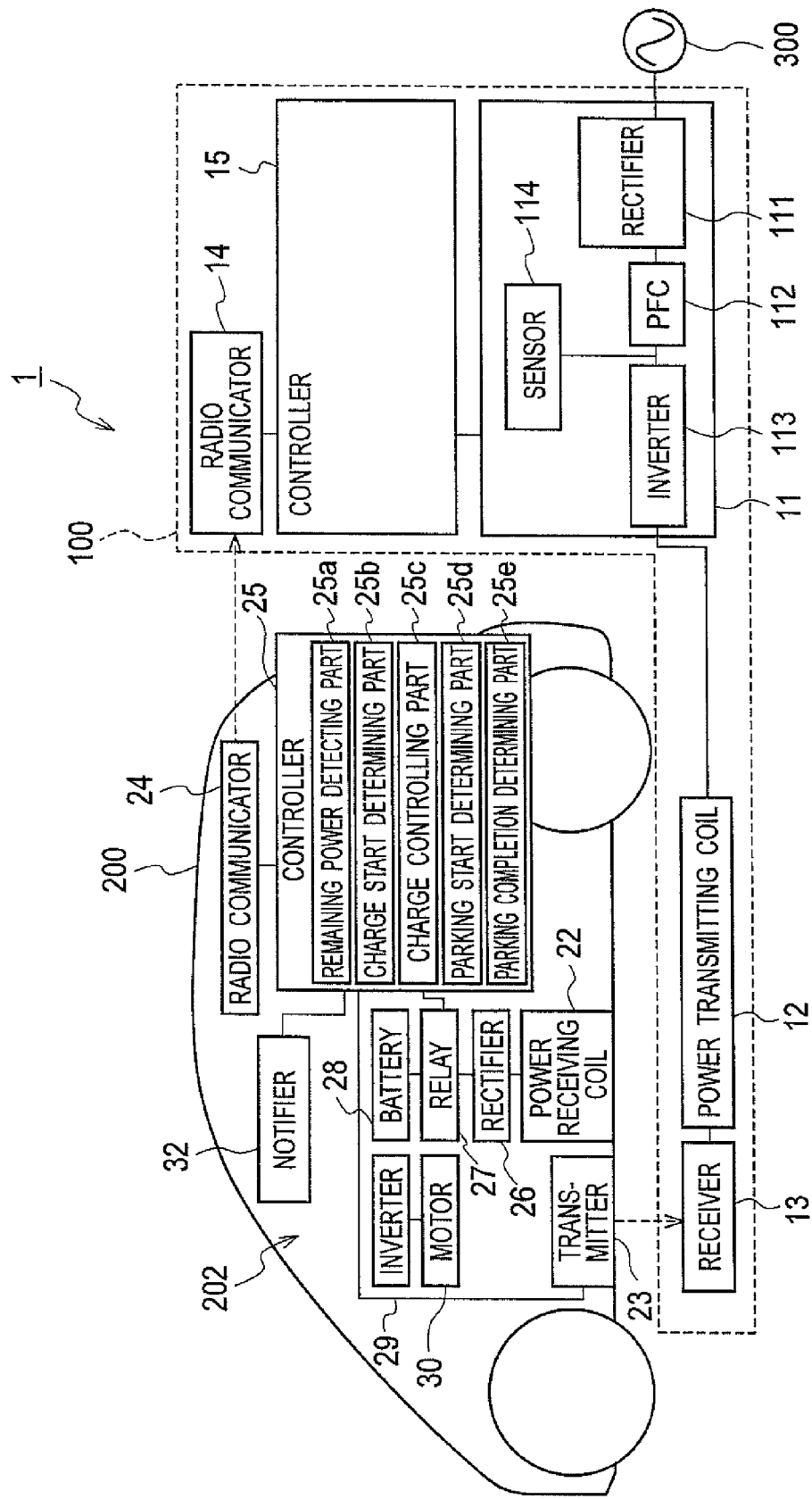
FIG. 5 is a block diagram showing a schematic configuration of a non-contact power supply system including a non-contact power supply apparatus according to a second embodiment.

The configuration of a non-contact power supply system including a non-contact power supply apparatus 202 according to the second embodiment will be described with reference to FIG. 5. The non-contact power supply apparatus 202 further includes a parking completion determining part (parking completion determining means) 25e in a controller 25.

The parking completion determining part 25e is configured to determine whether or not parking of its vehicle 200 is completed. For, example, the parking completion determining part 25e receives, through a radio communicator 24, information on the strengths of electromagnetic waves received by a receiver 13 of a ground-side unit 100, and determines whether or not the parking is completed based on the strengths of the electromagnetic waves.

In the second embodiment, a charge controlling part 25c is configured to transmit a signal to the ground-side unit 100 to start the ground-side unit 100 when the parking completion determining part 25e determines that parking is completed. In this way, the ground-side unit 100 will never be started until parking is completed. Thus, the power consumption can be reduced.

Figure 6:
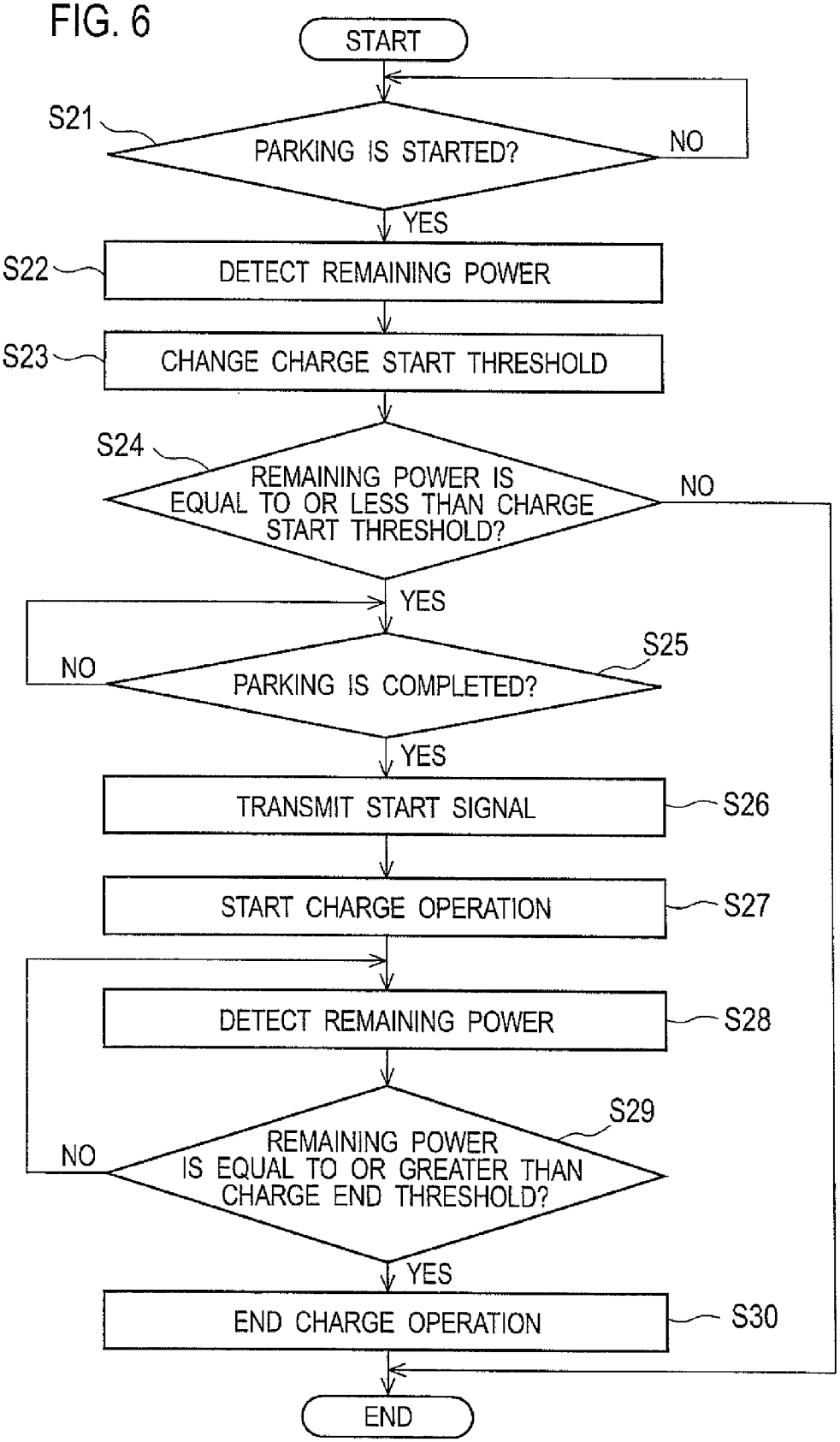
FIG. 6 is a flowchart showing an example of a non-contact power supply method according to the second embodiment.

An example of a non-contact power supply method according to the second embodiment will be described with reference to FIG. 6. Note that processes shown in steps S21 to S24 and S27 to 30 in FIG. 6 are the same as steps S1, S3 to S5, and S7 to S10 in FIG. 3 and will therefore not be described.

If a remaining power detecting part 25a determines that the remaining power of a battery 28 is equal to or less than a charge start threshold (S24: YES), the parking completion determining part 25e determines whether or not the parking is completed (S25). Whether or not the parking is completed is determined based on the strengths of electromagnetic waves received by the receiver 13. If it is determined that the parking is not yet completed (S25: NO), the process in step S25 is repeated until it is determined that the parking is completed.

If the parking completion determining part 25e determines that the parking is completed (25: YES), the charge controlling part 25c transmits a start signal to the ground-side unit 100 through the radio communicator 24 (S26). As a result, the ground-side unit 100 is started. Thereafter, the processes in steps S27 to S30 are performed, and the processing shown in FIG. 6 ends. Note that the processes performed during the parking are the same as those shown in FIG. 4.

With the non-contact power supply apparatus 202 according to the second embodiment, like the first embodiment, it is possible to further improve convenience. Moreover, it is possible to lower the charge start threshold to reduce the possibility of power shortage. Furthermore, it is possible to handle the decrease in remaining power due to self-discharge, and therefore prevent a situation, for example, where charge ends immediately after the start of the charge.

According to the second embodiment, when it is determined that parking is completed, a signal is transmitted to the ground-side unit 100 to start the ground-side unit 100. In this way, the ground-side unit 100 will never be started until parking is completed. Thus, the power consumption can be reduced.

The content of the present invention has been described above through examples. However, it is obvious to those skilled in the art that the present invention is not limited to this description and various changes and improvements can be made thereto.

For example, in the first and second embodiments, the remaining power detecting part 25a, the charge start determining part 25b, the charge controlling part 25c, the parking start determining part 25d, and the parking completion determining part 25e are included in the non-contact power supply apparatus (201, 202) on the vehicle 200 side. However, the present invention is not limited to the above, and the non-contact power supply apparatus (201, 202) including these constituent members (25a, 25b, 25c, 25d, 25e) may be provided in the ground-side unit 100. Alternatively, these constituent members (25a, 25b, 25c, 25d, 25e) may be distributed between the vehicle 200 side and the ground-side unit 100 side. In these examples, too, advantageous effects similar to those by the first and second embodiments can be achieved.

The conditions of use of the battery 28 are not limited to those described above. They simply need to be information related to the use of the battery 28, and may be the degree of degradation, the temperature of the battery 28, and/or some other type of information.

The invention claimed is:

1. A non-contact power supply apparatus including a power receiving coil and configured to transmit and receive power in a non-contact manner through magnetic coupling between the power receiving coil and a power transmitting coil included in a ground-side unit provided on a ground, comprising:
   a remaining power detector configured to detect remaining power of a battery included in a vehicle to be parked in a parking space in which the power transmitting coil is provided;
   a charge start determining circuit configured to determine whether or not to start a charge operation of the battery, based on whether or not the remaining power of the battery detected by the remaining power detector is equal to or less than a charge start threshold; and
   a charge controller configured to start the charge operation if the charge start determining circuit determines that the charge operation is to be started, wherein the charge start determining circuit changes the charge start threshold in accordance with a condition of use of the battery during travel of the vehicle before parking.

2. The non-contact power supply apparatus according to claim 1, wherein while the vehicle is parked in the parking space, the remaining power detector detects the remaining power every predetermined period of time and the charge start determining circuit compares the remaining power detected every predetermined period of time with the charge start threshold to determine whether or not to start the charge operation.

3. The non-contact power supply apparatus according to claim 1, further comprising a parking completion determining circuit configured to determine whether or not parking of the vehicle is completed, wherein
   the charge controller transmits a signal to the ground-side unit to start the ground-side unit if the parking completion determining circuit determines that the parking is completed.

4. The non-contact power supply apparatus according to claim 1, further comprising a parking start determining circuit configured to determine whether or not parking of the vehicle is started, wherein
   the charge controlling circuit transmits a signal to the ground-side unit to start the ground-side unit if the parking start determining circuit determines that the parking is started.

5. The non-contact power supply apparatus according to claim 1, wherein the charge controller ends the charge operation if the remaining power of the battery falls to or below a charge end threshold which is different from the charge start threshold.

6. A non-contact power supply apparatus including a power transmitting coil and configured to transmit and receive power in a non-contact manner through magnetic coupling between the power transmitting coil and a power receiving coil included in a vehicle-side unit provided in a vehicle, comprising:
   a remaining power detector configured to detect remaining power of a battery included in the vehicle to be parked in a parking space in which the power transmitting coil is provided;
   a charge start determining circuit configured to determine whether or not to start a charge operation of the battery, based on whether or not the remaining power of the battery detected by the remaining power detector is equal to or less than a charge start threshold; and
   a charge controller configured to start the charge operation if the charge start determining circuit determines that the charge operation is to be started, wherein the charge start determining circuit changes the charge start threshold in accordance with a condition of use of the battery during travel of the vehicle before parking.

7. A non-contact power supply system including a vehicle-side unit including a power receiving coil, and a ground-side unit including a power transmitting coil configured to transmit power in a non-contact manner to the power receiving coil through magnetic coupling, comprising:
   a remaining power detector configured to detect remaining power of a battery included in a vehicle to be parked in a parking space in which the power transmitting coil is provided;

a charge start determining circuit configured to determine whether or not to start a charge operation of the battery, based on whether or not the remaining power of the battery detected by the remaining power detector is equal to or less than a charge start threshold; and a charge controller configured to start the charge operation if the charge start determining circuit determines that the charge operation is to be started, wherein the charge start determining circuit changes the charge start threshold in accordance with a condition of use of the battery during travel of the vehicle before parking.

8. A non-contact power supply method for transmitting and receiving power through magnetic coupling between a power receiving coil provided in a vehicle and a power transmitting coil provided on a ground, comprising:

detecting remaining power of a battery included in the vehicle to be parked in a parking space in which the power transmitting coil is provided;

determining whether or not to start a charge operation of the battery, based on whether or not the remaining power of the battery thus detected is equal to or less than a charge start threshold;

starting the charge operation if it is determined that the charge operation is to be started; and charging the charge start threshold in accordance with a condition of use of the battery during travel of the vehicle before parking.

9. A non-contact power supply apparatus including a power receiving coil and configured to transmit and receive power in a non-contact manner through magnetic coupling between the power receiving coil and a power transmitting coil included in a ground-side unit provided on a ground, comprising:

remaining power detecting means for detecting remaining power of a battery included in a vehicle to be parked in a parking space in which the power transmitting coil is provided;

charge start determining means for determining whether or not to start a charge operation of the battery, based on whether or not the remaining power of the battery detected by the remaining power detecting means is equal to or less than a charge start threshold; and charge controlling means for starting the charge operation if the charge start determining means determines that the charge operation is to be started, wherein the charge start determining part changes the charge start threshold in accordance with a condition of use of the battery during travel of the vehicle before parking.

* * * * *